J. HUSTON.
Corn-Planter.

No. 19,144. Patented Jan. 19, 1858.

UNITED STATES PATENT OFFICE.

JOHN HUSTON, OF OTTAWA, ILLINOIS.

IMPROVEMENT IN SEEDING-MACHINES.

Specification forming part of Letters Patent No. 19,144, dated January 19, 1858.

*To all whom it may concern:*

Be it known that I, JOHN HUSTON, of Ottawa, in the county of La Salle and State of Illinois, have invented a new and useful Improvement in Seeding-Machines; and I do hereby declare that the following is a full, clear, and exact description of the same, reference being had to the annexed drawings, making a part of this specification, in which—

Figure 1:
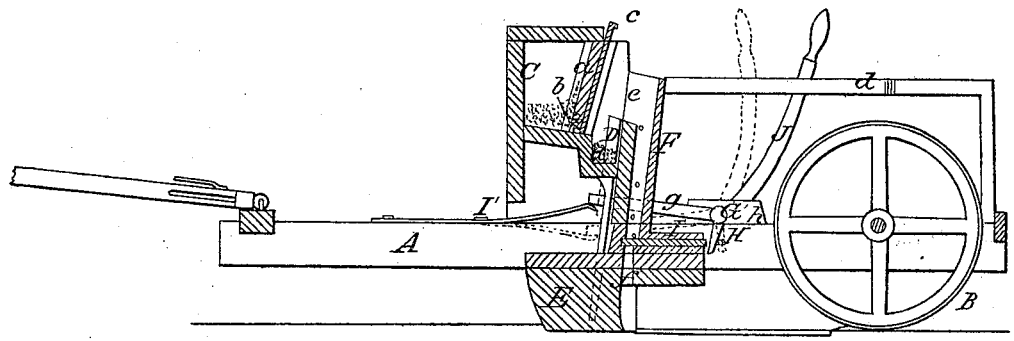
Figure 2:
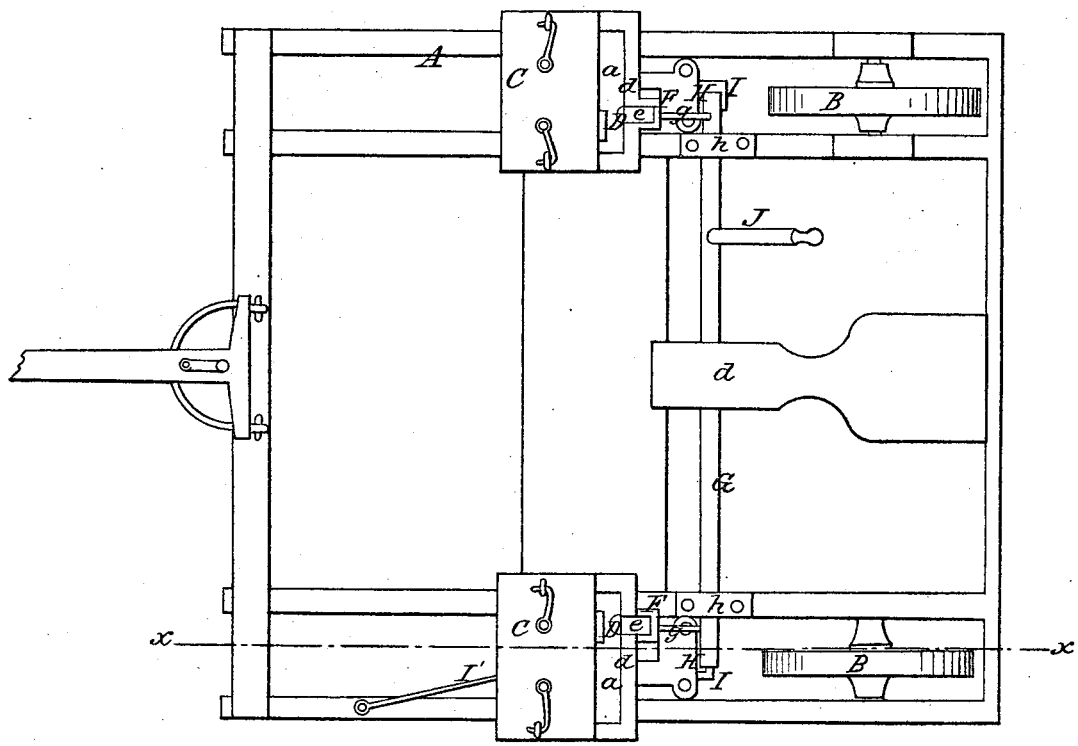

Figure 1 is a longitudinal section of my improvement taken in the line $x\ x$, Fig. 2. Fig. 2 is a plan or top view of same.

Similar letters of reference indicate corresponding parts in the two figures.

This invention relates to an improvement in the distributing device, whereby the seed is distributed in an even manner or equally measured at each discharge and the device effectually prevented from being clogged or choked.

To enable those skilled in the art to fully understand and construct my invention, I will proceed to describe it.

A represents a horizontal rectangular frame, which is mounted upon wheels B B, and has two seed-boxes, C C, placed upon it, one at each side. Within each seed-box C a partition, $a$, is placed, an opening, $b$, being allowed in the lower end of each partition. To the back side of each partition $a$ slide $c$ is attached for the purpose of regulating the size of the openings $b$. At the back part of each seed-box there is a recess or chamber, $d$, and a rod or bar, D, passes up through each chamber $d$, the upper ends of the rods being concave. The lower ends of the rods are fitted loosely above the shares E attached to the frame. To the back side of each seed-box there is attached a tube, F, and the upper ends of these tubes communicate with the upper parts of the seed-boxes, as shown at $e$, and the upper parts of the rods or bars D are placed at the inner sides of the upper parts of the tubes F. (See Fig. 1.) The lower ends of the tubes F communicate with passages $f$ in the back parts of the shares. The rods or bars D are slightly inclined from a horizontal position, and levers $g\ g$ pass through the rods or bars D, said levers being attached to a shaft, G, which is placed transversely in the frame A and allowed to turn freely in its bearings $h\ h$. The outer ends of the shaft G have short arms or levers H H, attached one at each end, and the lower ends of these arms or levers are fitted in the outer ends of slides I, one being fitted horizontally in each tube F, as shown clearly in Fig. 1. The arms or levers H are at right angles with the levers $g\ g$, and springs I' are attached at one end to the frame A, the opposite ends bearing against the front ends of the levers $g\ g$, said springs having a tendency to keep the rods or bars D elevated and the slides I thrown in.

To the shaft G a hand-lever, J, is attached, said lever being within a short distance of the driver's seat $d$.

From the above description of parts it will be seen that as the upper end of the lever J is shoved forward the bars D will be lowered and the slides I drawn out, the bar and slide moving in a reverse direction when the lever J is drawn backward. When the rods or bars D move upward a certain quantity of seed (as much as the cavities in the upper ends will contain) is elevated and discharged into the upper ends of the tubes F, said seed falling upon the slides I, and when the bars descend the slides I are drawn outward, and the seed passes down the passages $f$ into the furrows made by the shares E. The seed is allowed to pass in suitable quantities into the chambers $d$ by regulating the slides $c$, and the rods or bars D are moved upward principally by the action of the springs I'.

By this improvement the seed is discharged from points near the furrows, and is not liable to scatter as it drops. The distributing device cannot become choked or clogged, for the bars D will always carry upward the requisite quantity at each upward movement, and owing to the small quantity discharged each time into the tubes F they cannot become clogged. The seed will also be evenly measured or discharged in equal quantities.

I am aware that two slides have been used and so arranged as to work conjointly, so that the seed will be passed first from the seed-box into a chamber or tube and thence into the furrow; but so far as I am aware horizontal slides have only been used, and those do not operate efficiently, as they are liable to clog or choke.

I do not claim broadly and irrespective of the arrangement herein shown the employment or use of two slides for distributing seeds; but,

Having thus described my invention, what I claim as new, and desire to secure by Letters Patent, is—

The arrangement of the shaft G, levers J g H, spring I', bar D, and slide I, substantially as and for the purposes shown, whereby when lever J is moved forward the lever g operates the bar D, lever H operates slide I, and spring I' acts to restore or throw the said parts to their first position.

JOHN HUSTON.

Witnesses:
J. W. HURLBUT,
S. E. KING.